(12) United States Patent
Greywall

(10) Patent No.: US 7,411,322 B2
(45) Date of Patent: Aug. 12, 2008

(54) MICROMACHINED RELUCTANCE MOTOR

(75) Inventor: Dennis S. Greywall, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 220 days.

(21) Appl. No.: 11/294,952

(22) Filed: Dec. 6, 2005

(65) Prior Publication Data

US 2007/0126300 A1   Jun. 7, 2007

(51) Int. Cl.
   *H02K 1/06*    (2006.01)
   *H02K 1/22*    (2006.01)
   *H02K 5/173*   (2006.01)
   *H02K 19/10*   (2006.01)

(52) U.S. Cl. ............................. 310/40 MM; 310/49 R; 310/90; 310/159

(58) Field of Classification Search ........... 310/40 MM, 310/184–185, 49 R, 207, 90, 159
   See application file for complete search history.

(56) References Cited

U.S. PATENT DOCUMENTS

| | | | | |
|---|---|---|---|---|
| 3,131,979 | A | * | 5/1964 | Shobert ....................... 384/298 |
| 5,592,037 | A | * | 1/1997 | Sickafus ............... 310/40 MM |
| 5,710,466 | A | * | 1/1998 | Allen et al. ........... 310/40 MM |
| 5,874,798 | A | * | 2/1999 | Wiegele et al. ............. 310/168 |
| 6,208,485 | B1 | * | 3/2001 | Chainer et al. ............ 360/98.07 |
| 6,380,661 | B1 | | 4/2002 | Henderson et al. .......... 310/328 |
| 6,815,859 | B2 | | 11/2004 | Sakuma et al. .......... 310/156.53 |
| 6,894,593 | B2 | | 5/2005 | Reinicke ....................... 335/78 |

FOREIGN PATENT DOCUMENTS

| | | |
|---|---|---|
| DE | 19845914 | 4/2000 |
| GB | 1281992 | 7/1972 |
| JP | 2000003417 | 1/2000 |
| JP | 2004032957 | 1/2004 |
| WO | WO 03/044927 A1 | 5/2003 |

OTHER PUBLICATIONS

Ahn et al. ("A planar variable reluctance magnetic micromotor with fullyintegrated stator and coils", Journal of Microelectromechanical Systems, Dec. 1993, vol. 2, Issue 4, pp. 165-173).*

(Continued)

*Primary Examiner*—Burton Mullins

(57) ABSTRACT

A reluctance motor having a movable part that does not need a fixed mounting shaft in the motor's stationary part. In one embodiment, a motor of the invention has a stationary part that defines a cylindrical cavity into which a rotor is inserted, with an interior wall of the cavity covered by nonmagnetic lining. The stationary part has a plurality of stator poles, each defined by an electric coil having a magnetic core. The rotor has a spacer and a plurality of bearings, with each bearing at least partially confined between the spacer and the lining. The rotor is adapted to spin within the cavity in response to the excitation of one or more of the stator poles such that the bearings roll between the lining and the spacer. The motor can be implemented as a MEMS device, with the motor's stator being a substantially monolithic structure formed using a single substrate, which structure has a size on the order of 1 mm.

15 Claims, 10 Drawing Sheets

OTHER PUBLICATIONS

"Switched Reluctance Motors and Their Control," by T.J.E. Miller, Clarendon Press, Oxford, 1993, pp. 1-70.

"A Miniaturized Magnetic-Field Sensor System Consisting Of A Planar Fluxgate Sensor And A CMOS Readout Circuitry," by R. Gottfried-Gottfried et al., Sensors and Actuators A 54 (1996) pp. 443-447.

"Integrated, Variable-Reluctance Magnetic Minimotor," by E. J. O'Sullivan et al., IBM J. Res. Develop., 1998, v. 42, No. 5, pp. 681.

* cited by examiner

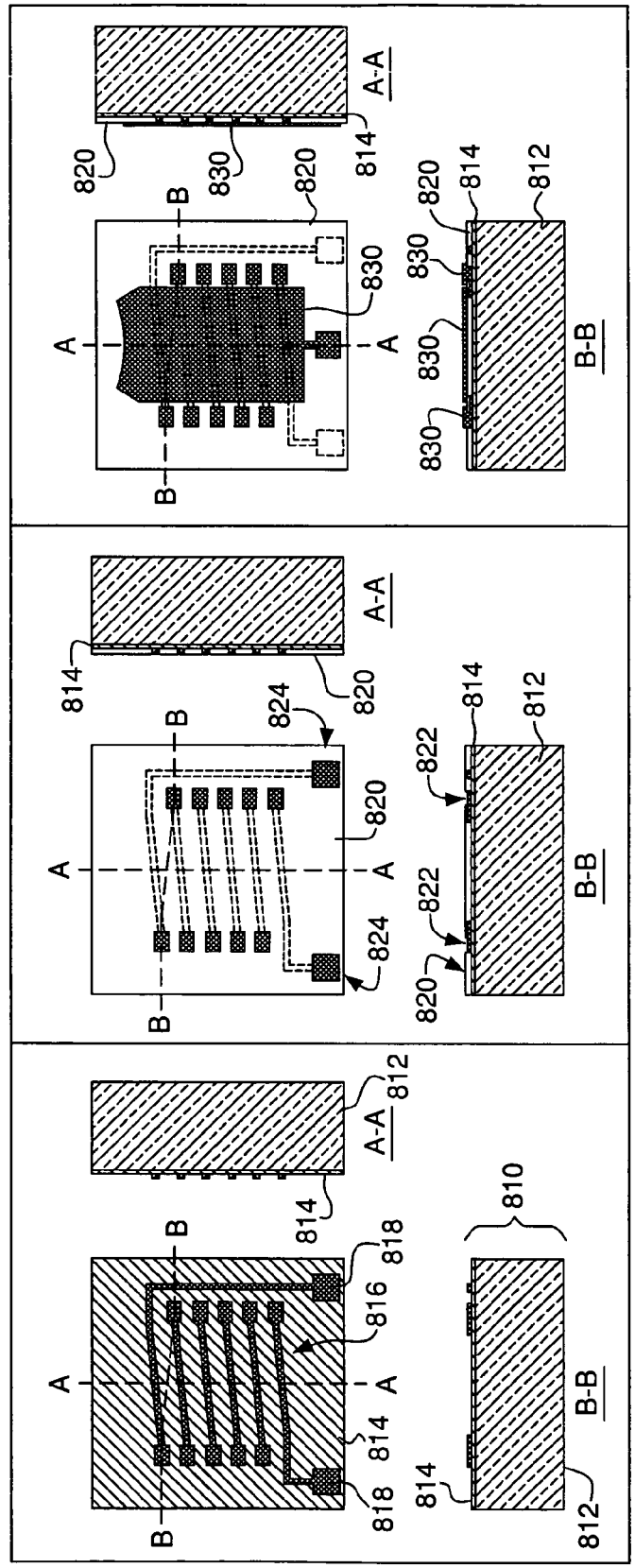

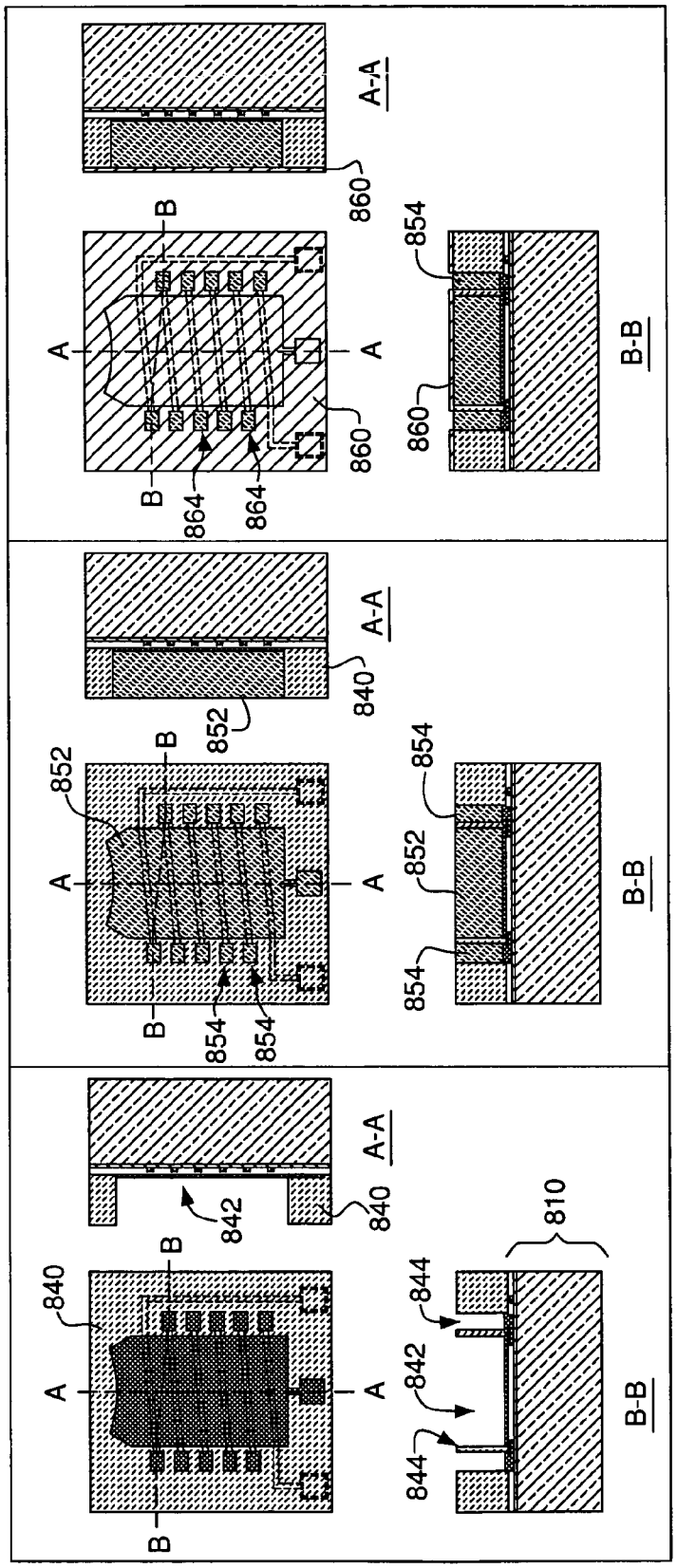

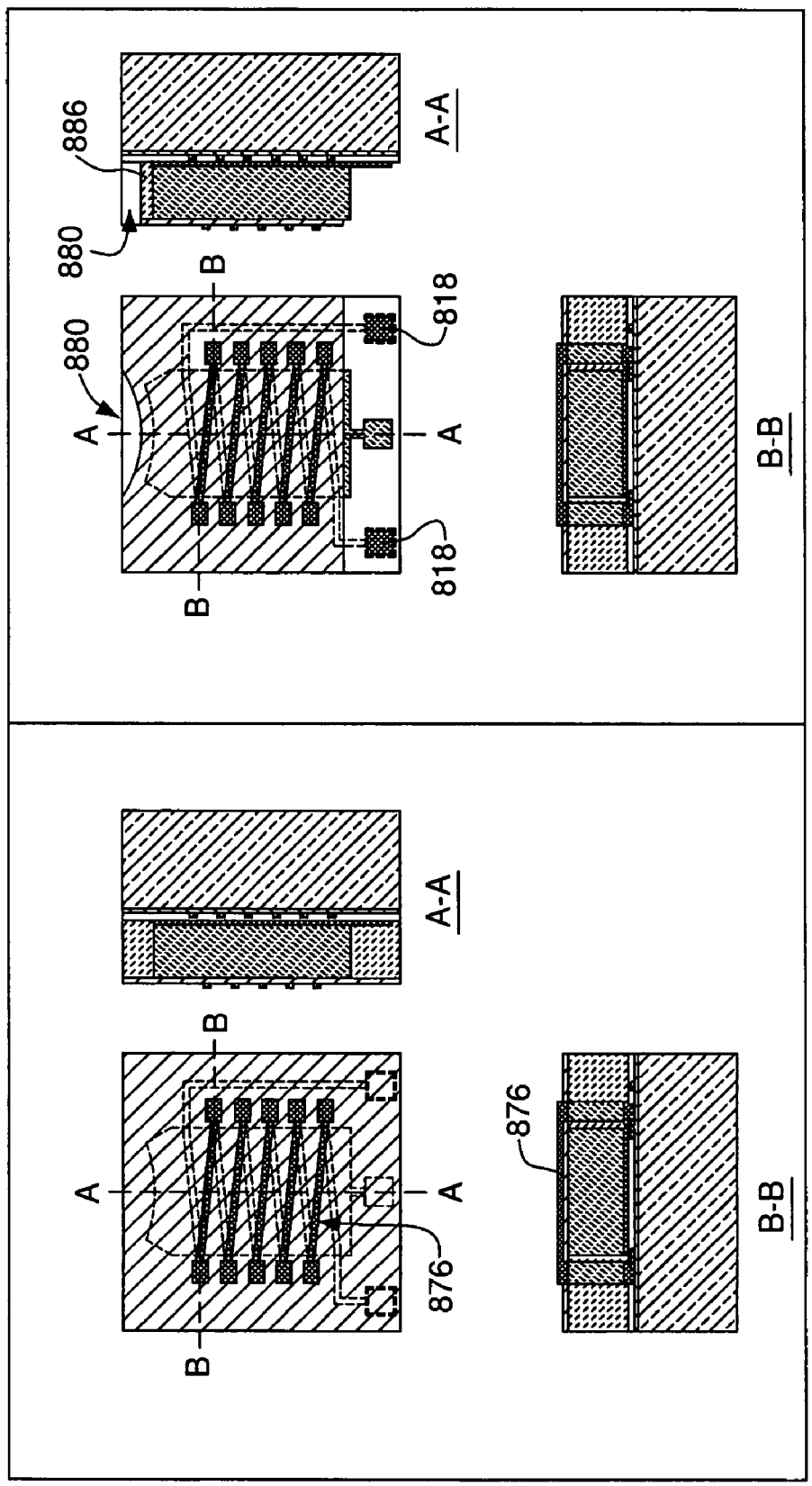

MICROMACHINED RELUCTANCE MOTOR

BACKGROUND OF THE INVENTION

1 Field of the Invention

The present invention relates generally to reluctance motors and, more specifically, to a miniaturized reluctance motor having at least a portion thereof formed using a MEMS fabrication technique.

2 Description of the Related Art

A reluctance motor is an electric motor, in which torque is produced by the tendency of the motor's moveable part to move to a position where the inductance of an excited motor winding is maximized. One feature of a reluctance motor is that the motor's moveable part (e.g., a rotor) does not need a permanent magnet. Instead, the rotor may be made of a magnetic material and constructed to have a cogged shape, with the cogs defining the rotor poles. The motor's stator (i.e., the electromagnetically active portion of the motor's stationary part) also has poles, which are associated with coil windings located around the rotor-containing cavity. Depending on the configuration, each motor winding can define one, two, or even more than two stator poles.

When a current is passed through a winding, each corresponding stator pole becomes excited and attracts the nearest rotor pole. As a result, the rotor poles move towards the excited stator poles, thereby rotating the rotor. If stator poles are excited in a particular sequence, e.g., by properly shaped drive pulses applied to the windings, smooth and continuous rotor rotation can be achieved. More details on the principles of operation and control of reluctance motors can be found, e.g., in a book by T. J. E. Miller, "Switched Reluctance Motors and Their Control," Clarendon Press, Oxford, 1993, pp. 1-70, the teachings of which are incorporated herein by reference.

Many important applications, such as miniature magnetic disk drives, fluid pumps, and gyroscopes, require miniature motors. MEMS-based motors are particularly attractive for these applications because fabrication of such motors is compatible with fabrication of microelectronic circuits. As a result, a MEMS-based motor and the associated control electronics can advantageously be produced as a single integrated device that is generally more reliable and less expensive than its non-integrated analogue. However, one problem with prior-art MEMS-based motors is that their relatively small size renders lubrication of such motors impractical, which results in relatively high friction and short lifetime.

SUMMARY OF THE INVENTION

Problems in the prior art are addressed by various embodiments of a reluctance motor having a rotor that does not need a fixed mounting shaft in the motor's stationary part.

In one embodiment, a motor of the invention has a stationary part that defines a cylindrical cavity into which the rotor is inserted, with the interior wall of the cavity covered by a nonmagnetic lining. The stationary part has a plurality of stator poles, each defined by an electric coil having a magnetic core. The rotor has a spacer and a plurality of bearings, with each bearing at least partially confined between the spacer and the lining. The rotor is adapted to spin within the cavity in response to the excitation of one or more of the stator poles such that the bearings roll between the lining and the spacer. The motor can be implemented as a MEMS device, with the motor's stator being a substantially monolithic structure formed using a single substrate, which structure has a size on the order of 1 mm.

Advantageously, a motor of the invention has lower friction than a comparable prior-art motor because, in the motor of the invention, the bearings roll against the lining while, in the prior-art motor, the rotor rubs against the shaft. Since the rolling friction is generally substantially lower than the rubbing friction, friction in the motor of the invention can be significantly reduced compared to that in the prior-art motor.

According to one embodiment, the invention is an electric motor, comprising: a stationary part that comprises a lining and a plurality of poles; and a movable part that comprises a spacer and a plurality of bearings, wherein: the lining is located between the poles and the movable part; each bearing is at least partially confined between the spacer and the lining; the movable part is adapted to move with respect to the stationary part in response to excitation of one or more of the poles; and the bearings are adapted to roll between the lining and the spacer when the movable part moves with respect to the stationary part.

According to another embodiment, the invention is a method of fabricating an electric motor, comprising: forming a stationary part of the motor using a single substrate, wherein said stationary part is a substantially monolithic structure; and inserting a movable part of the motor into a cavity defined by the stationary part, wherein: the stationary part comprises a lining and a plurality of poles; the movable part comprises a spacer and a plurality of bearings; the lining is located between the poles and the movable part; each bearing is at least partially confined between the spacer and the lining; the movable part is adapted to move with respect to the stationary part in response to excitation of one or more of the poles; and the bearings are adapted to roll between the lining and the spacer if the movable part moves with respect to the stationary part.

According to yet another embodiment, the invention is n electric motor, comprising: a stationary part that comprises a plurality of poles; and a rotor adapted to rotate with respect to the stationary part in response to excitation of one or more of the poles, wherein the stationary part does not have a fixed shaft for mounting the rotor such that the rotor would be able to rotate about said shaft.

BRIEF DESCRIPTION OF THE DRAWINGS

FIGS. 8A-I show a representative fabrication process that can be used to produce a motor according to yet another embodiment of the invention.

DETAILED DESCRIPTION

Figure 2:
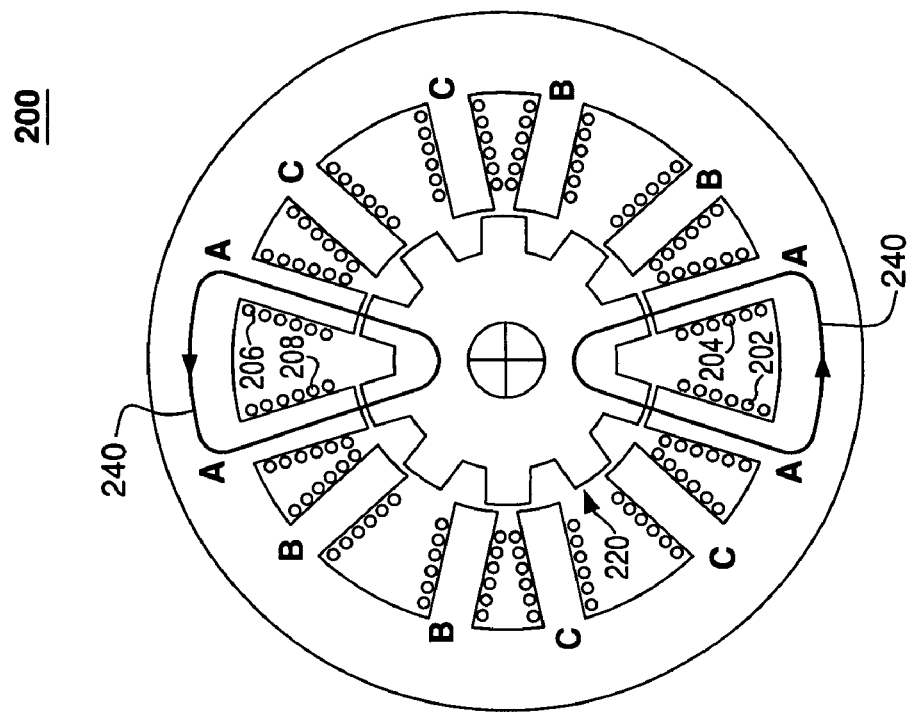
FIGS. 1-2 show cross-sectional views of two prior-art reluctance motors.
Figure 1:
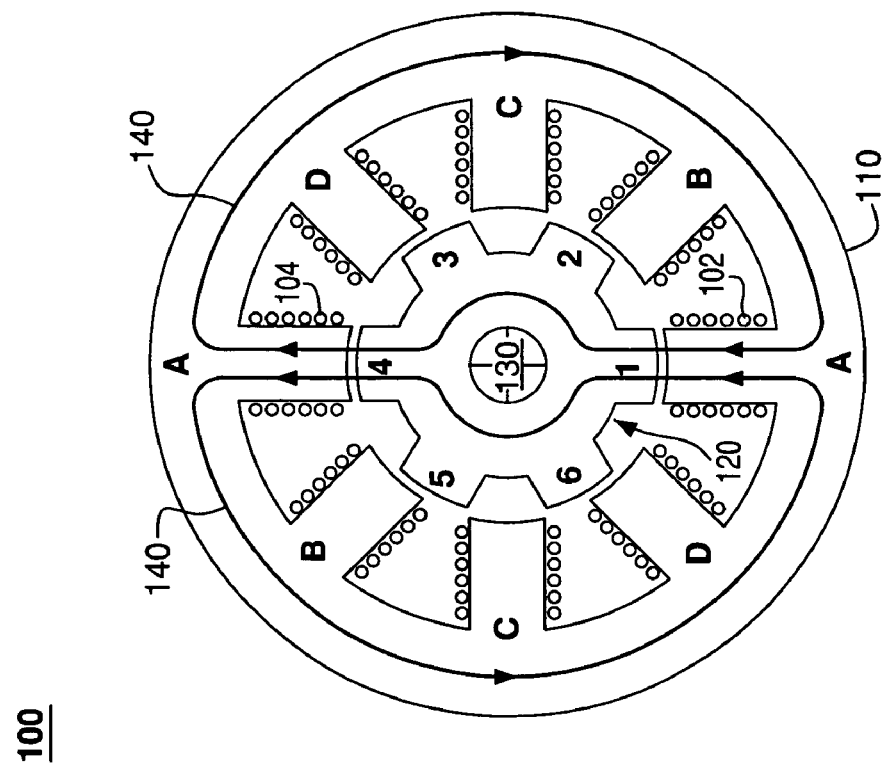

FIGS. 1-2 show cross-sectional views of prior-art reluctance motors 100 and 200, respectively. More specifically, motor 100 is a four-phase 8/6 reluctance motor, i.e., a motor having four independent windings (phases), eight stator poles, and six rotor poles. Similarly, motor 200 is a three-phase 12/10 reluctance motor.

Referring to FIG. 1, motor 100 has four independent stator windings (phases) labeled A-D. Each phase has two coils connected in series and located on opposite sides of the interior cavity of the motor. For example, phase A has coils 102 and 104 positioned such that the north pole of coil 102 and the south pole of coil 104 face the interior cavity. The north pole of coil 102 and the south pole of coil 104 are two stator poles of motor 100. Since each of phases B-D has two coils analogous to coils 102 and 104, motor 100 has a total of eight stator poles. Each of the coils in motor 100 has a ferromagnetic core, with the ferromagnetic cores of different coils connected to a circular ferromagnetic element 110 in a spike-and-wheel pattern.

A rotor 120 of motor 100 is a cogged disk that is made of a ferromagnetic material and rotatably mounted on a fixed shaft 130 located at the axial center of the interior cavity of the motor. Rotor 120 has an axial hole in the center, and shaft 130, on which the rotor is mounted, passes through the axial hole. Rotor 120 also has six cogs labeled 1-6 in FIG. 1. These cogs 1-6 define the six rotor poles of the motor. Because motor 100 has six rotor poles and eight stator poles, at least some of the rotor poles are always misaligned with the stator poles regardless of the relative orientation of the rotor and stator. As further explained below, this ever-present misalignment is used to produce rotation of rotor 120 about shaft 130.

The ferromagnetic cores of the coils, ferromagnetic element 110, and rotor 120 are capable of providing a substantially continuous magnetic-flux path for each of phases A-D. In particular, ferromagnetic element 110 provides a portion of the magnetic-flux path around the periphery of motor 100, while rotor 120, if properly oriented with respect to a particular phase, provides a portion of the magnetic-flux path for that phase through the interior cavity of the motor. For example, when cogs 1 and 4 of rotor 120 are aligned with the magnetic cores of coils 102 and 104, the rotor bridges the air gap between those cores and creates a magnetic-flux path indicated by flux lines 140 in FIG. 1. This rotor orientation substantially maximizes the inductance of phase A. At the same time, cogs 2-3 and 5-6 of rotor 120 are misaligned with the magnetic cores of phases B-D, which creates relatively wide air gaps in the magnetic-flux paths corresponding to those phases and causes them to have relatively low inductances.

Rotation of rotor 120 in motor 100 can be produced, for example, as follows. When phase A is excited, the resulting electromagnetic force pulls cogs 1 and 4 of rotor 120 into alignment with the magnetic cores of coils 102 and 104 as shown in FIG. 1. Next, phase A is turned off and phase B is excited, which pulls cogs 2 and 5 into alignment with the magnetic cores of phase B to maximize the inductance of phase B. After that, phase B is turned off and phase C is excited, which pulls cogs 3 and 6 into alignment with the magnetic cores of phase C to maximize the inductance of phase C. Then, phase C is turned off and phase D is excited, which pulls cogs 1 and 4 into alignment with the magnetic cores of phase D to maximize the inductance of phase D, and so on. This A-B-C-D excitation sequence is repeated to rotate rotor 120 clockwise. Of course, changing the excitation sequence to A-D-C-B would produce counterclockwise rotation of rotor 120. Each time the next phase of motor 100 is excited, rotor 120 rotates by 15 degrees. This rotation increment is often referred to as the stroke of the motor. In one excitation cycle or four strokes, rotor 120 turns 60 degrees, and one full rotor revolution is accomplished in six excitation cycles.

Referring now to FIG. 2, motor 200 is substantially analogous to motor 100 and operates in a similar fashion. However, one difference between motors 100 and 200 is that each phase of the latter motor has four coils, as opposed to two coils in the former motor. For example, phase A of motor 200 has coils 202, 204, 206, and 208 connected such that (i) coils 202 and 206 have their south poles facing the interior cavity of motor 200 and (ii) coils 204 and 208 have their north poles facing that cavity. As a result, the magnetic-flux path for phase A in motor 200 indicated by flux lines 240 is significantly shorter than the magnetic-flux path for phase A in motor 100 (see flux lines 140 in FIG. 1). Having a shorter magnetic-flux path is advantageous because magnetic-path losses are reduced accordingly. In one excitation cycle or three strokes, rotor 220 of motor 200 turns 36 degrees, and one full rotor revolution is accomplished in ten excitation cycles.

One problem with motors 100 and 200 is that, when implemented in a miniature form, these motors might exhibit unstable rotor behavior and generally have relatively low durability. For example, when rotor 120 in motor 100 has a diameter of about 1 mm, shaft 130 typically has a diameter of about 100 µm. For practical reasons, at these sizes, it is very difficult to have a clearance between rotor 120 and shaft 130 smaller than about 10 µm. Since this amount of clearance constitutes a relatively large portion of the shaft diameter, rotor 120 undergoes relatively large eccentric excursions as it rotates about shaft 130. These excursions cause vibrations detrimental to the motor's performance. In addition, at these sizes, depositing lubricant between shaft 130 and rotor 120 becomes relatively difficult to do and is usually neglected. As a result, friction between shaft 130 and rotor 120 is relatively high even when eccentric excursions are relatively small. The eccentric excursions further exacerbate the adverse effects of this already high friction. Furthermore, a relatively small diameter of shaft 130 causes the shaft to have relatively low structural strength and be susceptible to deformations caused, e.g., by the electromagnetic pull of an excited coil on rotor 120, which causes the rotor to pull the shaft toward that coil. As explained in more detail below, at least some of these problems are addressed by providing various embodiments of a miniature motor constructed in accordance with the principles of the invention.

Figure 3:
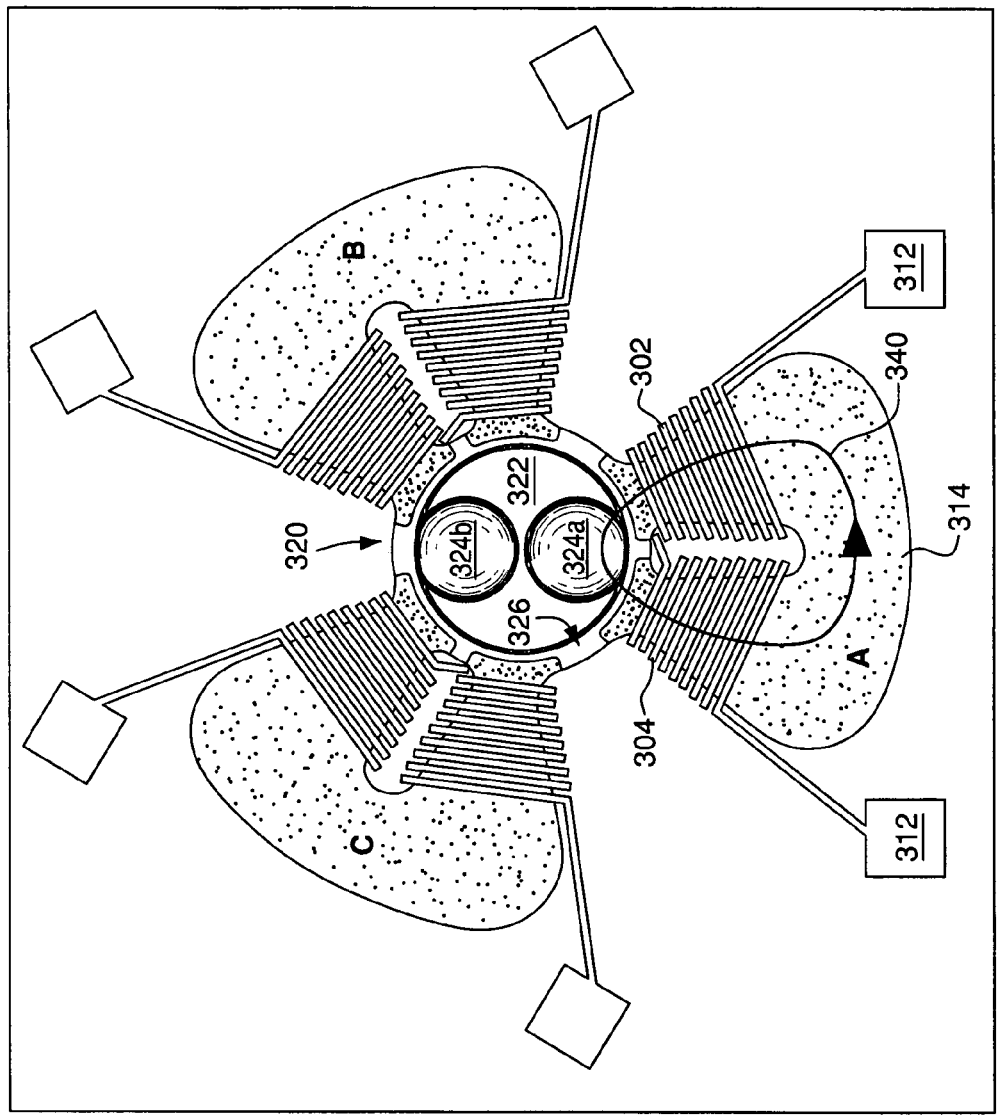
FIG. 3 shows a top view of a motor according to one embodiment of the invention.

FIG. 3 shows a top view of a motor 300 according to one embodiment of the invention. Motor 300 has three phases labeled A-C. Each phase has two coils that are connected in series and share a horseshoe-shaped magnetic core. For example, phase A of motor 300 has coils 302 and 304, which share a horseshoe-shaped magnetic core 314. Coils 302 and 304 are connected to contact pads 312 and to one another such that the north pole of coil 302 and the south pole of coil 304 face the interior cavity of the motor. Since each of phases B-C in motor 300 is analogous to phase A, this motor has a total of six stator poles.

A rotor 320 of motor 300 comprises (i) a notched spacer 322 inserted into the interior cavity of the motor and (ii) two spherical balls 324a-b inserted into the notches of the spacer. Each notch of spacer 322 having ball 324 is generally an opening shaped such as to accommodate the ball and expose at least a portion of the ball located at the outside perimeter of the spacer for contact with a nonmagnetic lining 326 of the interior cavity. Notched spacer 322 is made of a nonmagnetic material (e.g., silicon) and is shaped so as to provide, together with lining 326, appropriate physical confinement for balls 324a-b. During rotation of rotor 320, balls 324a-b roll against lining 326 and function as bearings for spacer 322.

Balls 324a-b are made of a magnetic material (e.g., stainless steel) and, as such, define rotor poles for rotor 320. When rotor 320 is appropriately oriented with respect to a particular phase, one of balls 324a-b substantially bridges the magnetic-material gap between the stator poles of that phase and, together with the respective horseshoe-shaped magnetic core, provides a substantially continuous magnetic-flux path for that phase. For example, with the rotor orientation depicted in FIG. 3, ball 324a substantially bridges the magnetic-material gap between the stator poles corresponding to coils 302 and 304 and, together with horseshoe-shaped magnetic core 314, provides a substantially continuous magnetic-flux path for phase A of motor 300. This magnetic-flux path is indicated in FIG. 3 by a flux line 340. A comparison of flux line 340 with one of flux lines 240 in FIG. 2 makes it evident that ball 324a is magnetically equivalent to two rotor cogs of rotor 220. As such, each of balls 324a-b defines two rotor poles for a total of four rotor poles in rotor 320. This fact makes motor 300 a three-phase 6/4 reluctance motor.

Rotation of rotor 320 in motor 300 can be produced, for example, as follows. When phase A is excited, the resulting electromagnetic force pulls one of balls 324, e.g., ball 324a, into alignment with horseshoe-shaped magnetic core 314 as shown in FIG. 3. Next, phase A is turned off and phase B is excited, which pulls ball 324b into alignment with the horseshoe-shaped magnetic core of phase B. After that, phase B is turned off and phase C is excited, which pulls ball 324a into alignment with the horseshoe-shaped magnetic core of phase C, and so on. This A-B-C excitation sequence is repeated to rotate rotor 320 clockwise. Similarly, applying the A-C-B excitation sequence would produce counterclockwise rotation of rotor 320. Each time the next phase of motor 300 is excited, rotor 320 turns 60 degrees. In one excitation cycle or three strokes, rotor 320 turns 180 degrees, and one full rotor revolution is accomplished in two excitation cycles.

In one embodiment, vertical confinement (i.e., confinement in the direction orthogonal to the plane of FIG. 3) of rotor 320 is achieved by providing top and bottom plates that seal the rotor cavity, with some accommodation to allow rotational motion to be transferred from rotor 320 to a rotatable structure (not shown) outside of motor 300. Alternatively or in addition, a weak permanent magnet located under the cavity can be used to hold balls 324 in place. If the diameter of balls 324 is smaller than the depth of the cavity, then motor 300 can be configured to levitate the balls within the cavity.

In one implementation, each of balls 324a-b is a commercially available 440-stainless-steel spherical ball having a diameter of about 0.006" (or 150 μm), spacer 322 has a diameter of about 350 μm, and the stator of motor 300 has a lateral size of about 1.5 mm. One skilled in the art will appreciate that the stator of motor 300 is scalable and can be implemented to have any lateral size between about 1 and 20 mm, and preferably between about 1 and 5 mm.

Having rotor 320 in motor 300 addresses at least some of the problems indicated above for prior-art motors, because rotor 320 does not need a shaft for its mounting in the interior cavity of the motor. Advantageously, the forces generated in motor 300 act upon balls 324a-b that are structurally robust and are not prone to the types of deformations that affect, e.g., shaft 130 in motor 100 (FIG. 1). In addition, rotor 320 in motor 300 has lower friction than, e.g., rotor 120 in motor 100, because, in the former motor, the acted-upon elements, i.e., balls 324a-b, roll against lining 326 while, in the latter motor, the acted-upon element, i.e., rotor 120, rubs against shaft 130. Since rolling friction is generally substantially lower than rubbing/sliding friction, motor 300 has lower friction than motor 100.

Figure 4:
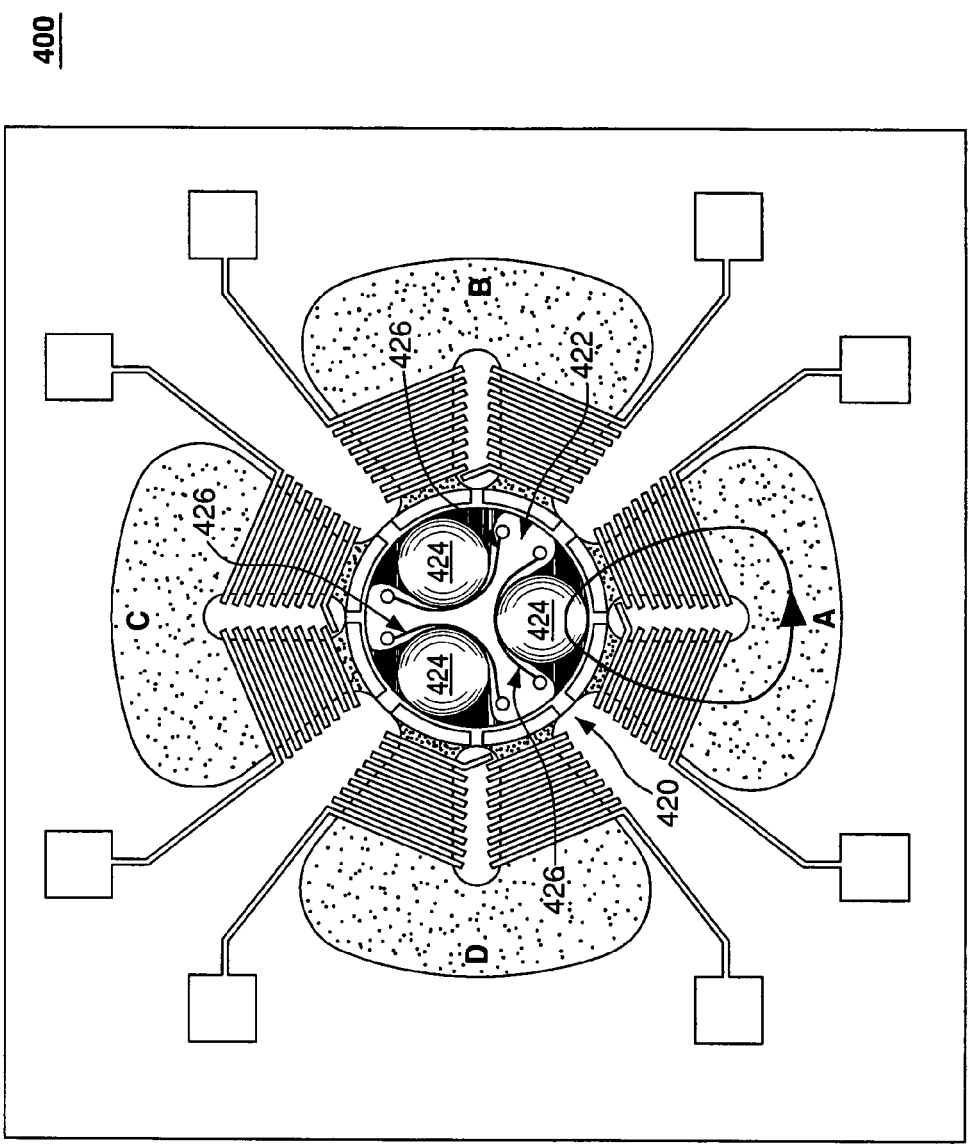
FIG. 4 shows a top view of a motor according to another embodiment of the invention.

FIG. 4 shows a top view of a motor 400 according to another embodiment of the invention. Motor 400 is generally analogous to motor 300 of FIG. 3. However, one difference between motors 400 and 300 is that motor 400 is a four-phase 8/6 motor. Accordingly, motor 400 has (i) four phases labeled A-D and (ii) a rotor 420 having three balls 424 and a compatibly shaped spacer 422. Compared to spacer 322 of motor 300, spacer 422 has three new elements, i.e., three springs 426. Each spring 426 is located at a notch of spacer 422 and configured to lightly push on the respective ball 424 with a force component in the outward radial direction. The combined action of springs 426 effectively centers spacer 422 within the interior cavity of motor 400 and reduces rotor play inside the cavity. In addition, the action of springs 426 reduces the effective contact area between spacer 422 and each of balls 424, which accordingly reduces friction between the balls and the spacer. The stroke of motor 400 is 30 degrees, and one full rotor revolution is accomplished in three excitation cycles.

In one configuration, motor 400 is operated as a switched motor. More specifically, motor 400 is provided with a rotor-orientation feedback circuit (not shown) to synchronize the switching of the phase drive currents with certain rotor positions. When intended for this type of operation, the design of motor 400 is optimized to provide efficient conversion of electrical power into the kinetic energy of rotor 420.

In another configuration, motor 400 is operated as a stepper motor. More specifically, motor 400 is run open-loop, i.e., without rotor-orientation feedback. When intended for this type of operation, the design of motor 400 is optimized to maintain step integrity/precision, rather than to achieve efficient power conversion.

Figure 5:
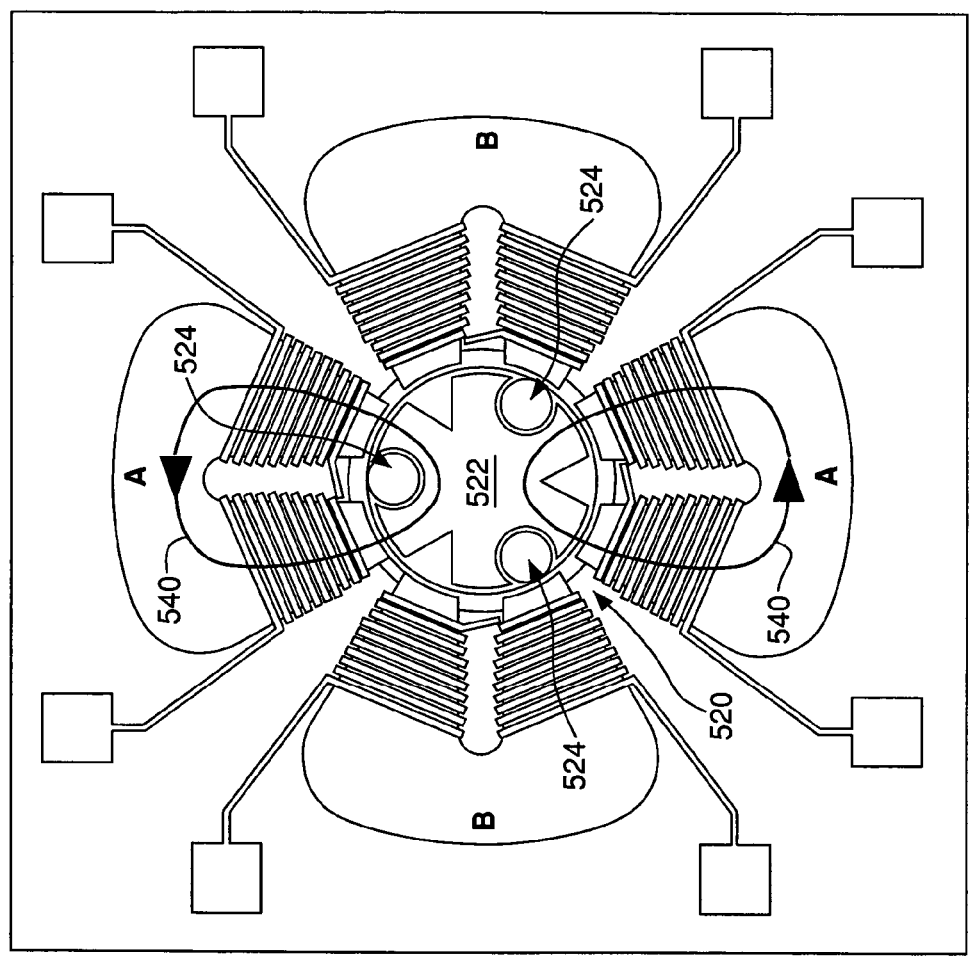
FIG. 5 shows a top view of a motor according to yet another embodiment of the invention.

FIG. 5 shows a top view of a motor 500 according to yet another embodiment of the invention. Although motor 500 has a stator structure that is substantially identical to the stator structure of motor 400, in a preferred configuration, stator coils corresponding to the horseshoe-shaped magnetic cores located at opposite sides of the rotor cavity in motor 500 are wired together, by providing appropriate electrical connections (not shown in FIG. 5) between the corresponding contact pads, to form two stator phases labeled A and B in FIG. 5. Accordingly, motor 500 is a two-phase motor.

Similar to rotor 420 of motor 400, a rotor 520 of motor 500 comprises three balls 524 and a corresponding notched spacer 522. However, unlike balls 424, balls 524 are made of a nonmagnetic (e.g., ceramic) material. As such, balls 524 do not define any rotor poles, but rather serve only as bearings for spacer 522. In contrast, spacer 522 itself is made of a magnetic material and has a shape of a cogged disk analogous to the shape of, e.g., rotor 120 (FIG. 1). As such, spacer 522 defines six rotor poles. Since each of phases A and B in motor 500 has four stator poles, motor 500 is a two-phase 8/6 reluctance motor.

When phase A of motor 500 is excited, the resulting forces act upon spacer 522 and orient rotor 520 as shown in FIG. 5. In this orientation, spacer 522 substantially bridges the magnetic-material gaps between the stator poles of phase A and creates a magnetic-flux path indicated in FIG. 5 by flux lines 540. Rotation of rotor 520 is achieved by sequentially exciting the two phases of motor 500. Since motor 500 is a two-phase motor, in a typical embodiment, this motor is provided with a parking mechanism and/or a starting assist mechanism (not shown in FIG. 5), which determine the rotor rotation direction. Various types of these mechanisms are well known in the art of reluctance motors and are described, e.g., in the above-referenced book by T. J. E. Miller. The stroke of motor 500 is 30 degrees, and one full rotor revolution is accomplished in six excitation cycles.

Figure 6:
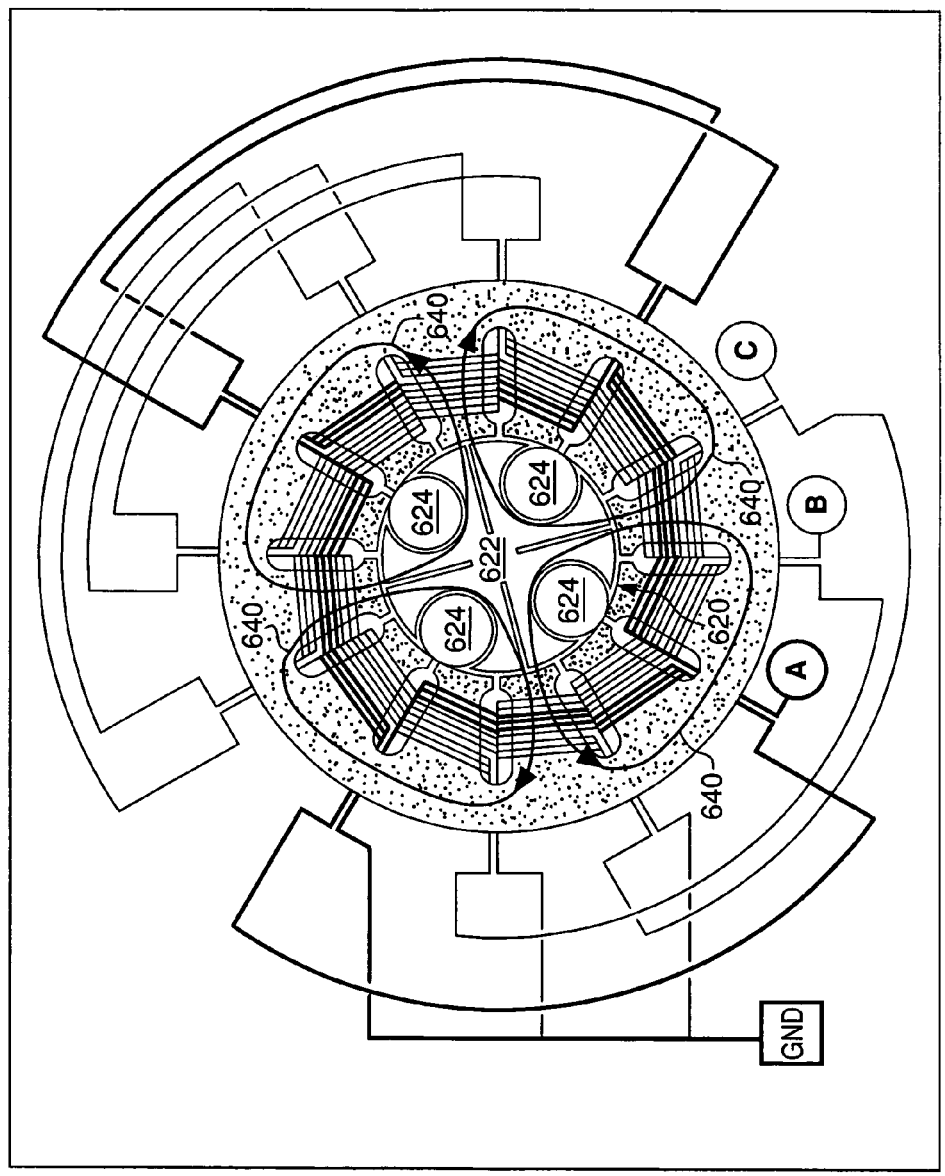
FIG. 6 shows a top view of a motor according to still another embodiment of the invention.

FIG. 6 shows a top view of a motor 600 according to still another embodiment of the invention. Motor 600 differs from above-described motors 300, 400, and 500 in that motor 600 is a synchronous reluctance motor, as opposed to being a switched and/or stepper reluctance motor as is each of motors 300, 400, and 500. Rather than having a separate coil for each stator pole, as in a switched reluctance motor, motor 600 has overlapping coils corresponding to different phases of the motor, similar to the coil windings of a typical industrial multiphase inductance motor. In particular, motor 600 has twelve stator poles, with each of the motor's three phases (labeled A-C) having a coil at each stator pole. For example, phase A has twelve serially connected coils indicated by the bold (wire) lines in FIG. 6. Each of phases B and C also has twelve serially connected coils that are similar to the coils of phase A, but located at shifted positions. More specifically, the coils of phase B have positions that are shifted in the counterclockwise direction by one stator pole with respect to the positions of the corresponding coils of phase A. Similarly, the coils of phase C have positions that are shifted in the counterclockwise direction by two stator poles with respect to the positions of the corresponding coils of phase A.

A rotor 620 of motor 600 is substantially analogous to rotor 520 of motor 500. However, rotor 620 has four nonmagnetic balls 624 and a matching magnetic spacer 622, as opposed to three nonmagnetic balls 524 and matching magnetic spacer 522 in rotor 520.

A rotating magnetic field in the rotor cavity of motor 600 is created, e.g., by applying three sine-wave currents that are 120 degrees apart with respect to one another to phases A-C, respectively, of the motor. In FIG. 6, flux lines 640 indicate a magnetic-field configuration produced when the sine-wave current applied to phase A is at a maximum. A similar magnetic-field configuration, but rotated 30 degrees in the counterclockwise direction with respect to the configuration shown in FIG. 6, is produced when the sine-wave current applied to phase B is at a maximum. The magnetic-field configuration rotates an additional 30 degrees when the sine-wave current applied to phase C is at a maximum, and so on. The relative phases of the sine-wave currents applied to phases A-C of motor 600 control the rotation direction of the magnetic field and, therefore, the rotation direction of rotor 620. For example, if the phases of the sine-wave currents are such that the magnetic field rotates in the counterclockwise direction, then the resulting torque turns spacer 622 (and therefore entire rotor 620) in the counterclockwise direction as well. Similarly, if the phases of the sine-wave currents are such that the magnetic field rotates in the clockwise direction, then rotor 620 also turns in the clockwise direction.

Figure 7:
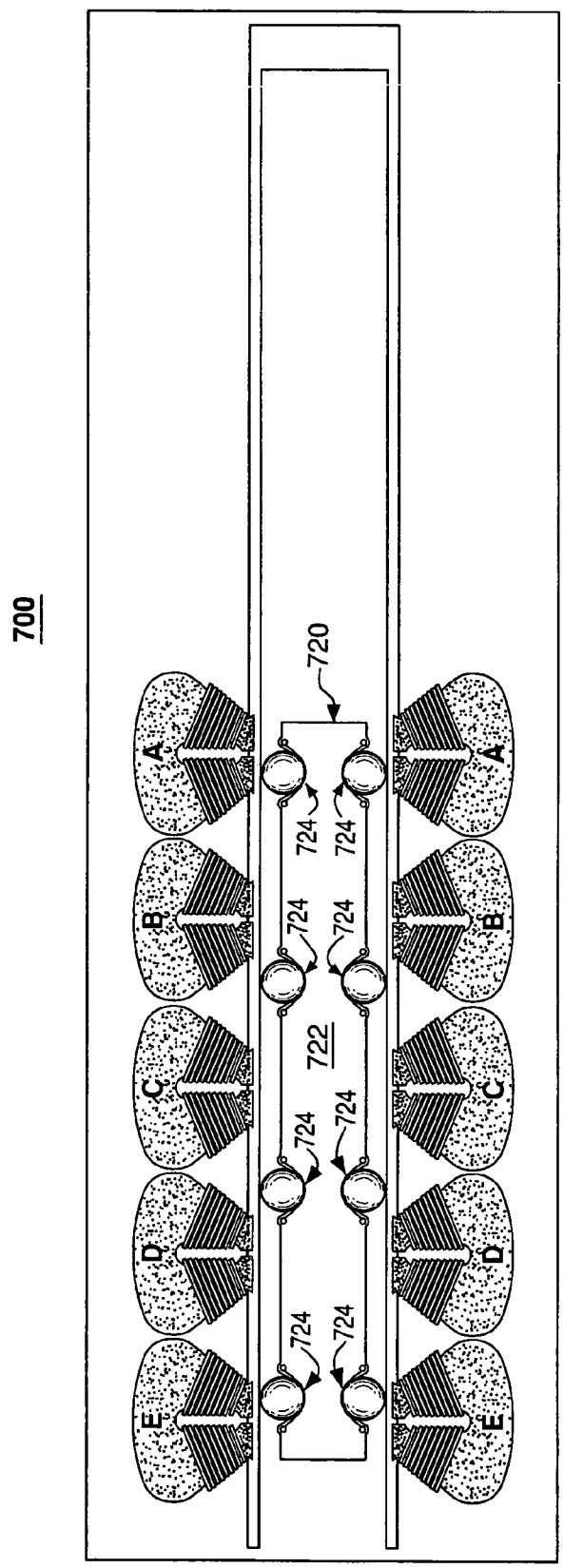
FIG. 7 shows a top view of a linear motor according to one embodiment of the invention.

FIG. 7 shows a top view of a linear motor 700 according to one embodiment of the invention. The physical principle of operation of motor 700 is similar to that of, e.g., motor 400 (FIG. 4), except that motor 700 is adapted to produce translation of a shuttle 720, while motor 400 is adapted to produce rotation of rotor 420. The stator of motor 700 has a plurality of phases, only five of which (labeled A-E) are illustratively shown in FIG. 7. Each of these phases comprises four coils on two horseshoe-shaped magnetic cores located at opposite sides of the motor's interior cavity. Additional coils may be placed along the motor's interior cavity as appropriate or necessary. Shuttle 720 comprises a nonmagnetic spacer 722 and eight magnetic balls 724.

The direction of travel for shuttle 720 is determined by the phase-excitation order, and the accessible length of travel for the shuttle is determined by the number of coils in motor 700. For example, the application of an A-B-C-D phase excitation sequence to motor 700 shifts shuttle 720 to the right with respect to the position shown in FIG. 7 and produces a shuttle position in which the two leftmost balls 724 are aligned with the coils of phase D. In that position, the two rightmost balls 724 have traveled beyond the coils of phase A. Similarly, the application of an E-D-C-B phase excitation sequence to motor 700 shifts shuttle 720 to the left with respect to the shown position. Therefore, in a typical embodiment, the number of stator coils in motor 700, their positions along the cavity containing shuttle 720, and the length of that cavity are chosen such as to ensure reversible travel of the shuttle along the cavity in both directions.

Figure 8I:
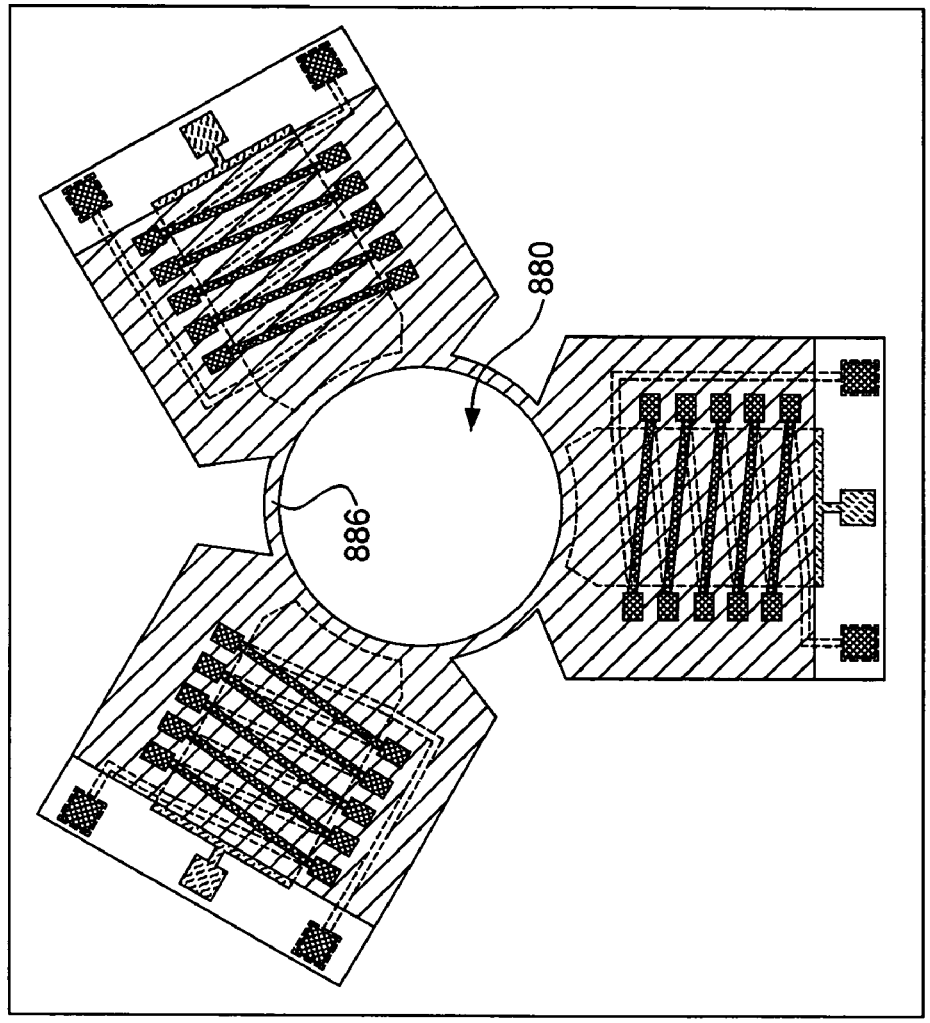

FIGS. 8A-I show a representative fabrication process that can be used to produce a motor according to one embodiment of the invention. More specifically, each of FIGS. 8A-H shows a top view and two cross-sectional side views of the nascent structure of one stator coil of the motor, and FIG. 8I shows a top view of the final stator structure. For illustrative purposes, the process of FIG. 8 is outlined in terms of a single stator coil having a substantially rectangular magnetic core. One skilled in the art will appreciate that a motor, e.g., having stator coils configured with horseshoe-shaped magnetic cores, can be produced in a similar fashion.

Referring to FIG. 8A, the fabrication process begins with a nonmagnetic, nonconductive substrate 810. In one embodiment, substrate 810 comprises a relatively thick (e.g., about 700 μm) silicon layer 812 covered with a relatively thin (e.g., about 0.5 pm) silicon-oxide layer 814. A metal deposition and lift-off process is then used to create a bottom portion 816 of the coil winding and the conducting tracks leading to contact pads 818. If necessary, portion 816, the conducting tracks, and contact pads 818 are thickened by electroplating.

Referring to FIG. 8B, the structure of FIG. 8A is first covered with a thin (e.g., about 0.5 μm) oxide layer 820. Layer 820 is then patterned and etched to create (i) vias 822 to portion 816 and (ii) vias 824 to contact pads 818.

Referring to FIG. 8C, a metal deposition and lift-off process is then used to create an electroplating electrode 830. Note that certain portions of electrode 830 fill up vias 822. In one embodiment, electrode 830 comprises titanium.

Referring to FIG. 8D, using spin coating, the structure of FIG. 8C is first covered with a relatively thick (e.g., about 150 μm) layer 840 of positive photo-resist. Layer 840 is then patterned and etched to create a mold 842 for the coil core and molds 844 for the posts forming the vertical (i.e., orthogonal to the plane of substrate 810) segments of the coil. In one embodiment, the aspect (i.e., depth-to-width) ratio for molds 844 is about 20.

Referring to FIG. 8E, using electroplating, molds 842 and 844 are filled with a conductive magnetic material, e.g., a Ni—Fe (81%-19%) alloy. Note that, because this alloy is electrically conductive, it is used for forming both magnetic core 852 and vertical segments 854 of the coil. In an alternative embodiment, appropriate different materials can be used to fill molds 842 and 844, respectively. The electroplating step is typically followed by a polishing step to arrive at a substantially planar structure shown in FIG. 8E.

Referring to FIG. 8F, using spin coating, the structure of FIG. 8E is first covered with a relatively thin (e.g., about 1 μm) layer 860 of positive photo-resist. Layer 860 is then patterned and etched to create vias 864 to the tops of vertical segments 854.

Referring to FIG. 8G, using a shadow mask, a conductive material (e.g., gold) is deposited over the structure of FIG. 8F to create a top portion 876 of the coil winding. If necessary, portion 876 is thickened by electroplating.

Referring to FIG. 8H, photo-resist layers 840 and 860 are exposed and etched to create an interior cavity 880 of the motor and uncover contact pads 818. Note that the remaining material of layers 840 and 860 creates nonmagnetic lining 886 of cavity 880 (see also FIG. 8I).

FIG. 8I shows a top view of a stator 890 that is produced using the fabrication steps outlined by FIGS. 8A-H. As can be seen in FIG. 8I, stator 890 is a substantially monolithic structure that has been fabricated using a single substrate. The motor fabrication process is completed by placing a rotor (not shown) into cavity 880 of stator 890. This rotor can be either a rotor similar to rotor 320 (FIG. 3) or a rotor similar to rotor 520 (FIG. 5). In either case, the rotor has rollers (e.g., spherical balls or cylindrical bearings) that roll against lining 886 of cavity 880 when the rotor spins inside the cavity.

While this invention has been described with reference to illustrative embodiments, this description is not intended to be construed in a limiting sense. Certain motors of the invention can be implemented both as switched motors and as stepper motors. Motors of the invention can be designed to have any desirable number of phases, stator poles, and/or rotor poles. Magnetic elements of the rotor can be laminated as known in the art. Various surfaces may be modified, e.g., by metal deposition for enhanced electrical conductivity or by ion implantation for enhanced mechanical strength.

Various suitable materials can be used to fabricate the motor parts. In general, a magnetic material is one that is attracted to a magnet. Some magnetic materials have relatively high magnetic permeability, e.g., about 100 or more. One example of such a magnetic material is a ferromagnetic material having iron, cobalt, nickel, chromium, molybdenum, and/or a combination thereof. Some materials, e.g., stainless steel, can be processed to be either magnetic or nonmagnetic. One suitable type of magnetic stainless steel is the so called "magnetically soft" stainless steel. This type of stainless steel was originally developed for solenoid plungers. A solenoid plunger is typically designed to respond efficiently to the magnetic field from the surrounding coil when the current is switched on, but when the current is switched off, the magnetic field induced in the plunger material quickly collapses, allowing the plunger to return to its original position. Similarly, a nonmagnetic material is one that is not attracted to a magnet. Typical nonmagnetic materials have relatively low magnetic permeability, e.g., lower than about 2.

Differently shaped coils, cores, rotors, shuttles, spacers, springs, cavities, electrodes, pads, and/or tracks may be implemented without departing from the scope and principle of the invention. Although rotors of the inventions have been described in the context of using spherical balls as the rotor bearings, any suitable rollers (e.g., rollers of cylindrical shape) can be used in place of the ball bearings. Although stators of the inventions have been described as having horseshoe-shaped magnetic cores, other shapes of magnetic cores/magnetic-flux-path elements can also be used. One example of such other shapes is provided, e.g., by a wheel-and-spike configuration of FIG. 1. Various modifications of the described embodiments, as well as other embodiments of the invention, which are apparent to persons skilled in the art to which the invention pertains are deemed to lie within the principle and scope of the invention as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, Microsystems, and devices produced using Microsystems technology or microsystems integration.

Although the present invention has been described in the context of implementation as MEMS devices, the present invention can in theory be implemented at any scale, including scales larger than micro-scale.

Unless explicitly stated otherwise, each numerical value and range should be interpreted as being approximate as if the word "about" or "approximately" preceded the value or the value range.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. The same applies to the term "implementation."

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An electric motor, comprising:
   a stationary part that comprises a lining and a plurality of poles; and
   a movable part that comprises a spacer and a plurality of bearings, wherein:
     the stationary part defines a cavity, wherein the lining covers an interior wall of the cavity;
     the lining is located between the poles and the movable part;
     the spacer comprises a notched disk;
     each bearing is located in a respective notch of said disk and at least partially confined between the spacer and the lining;
     the spacer further comprises one or more springs, each adapted to push a respective bearing toward the lining;
     the movable part is adapted to rotate with respect to the stationary part within the cavity in response to excitation of one or more of the poles; and
     the bearings are adapted to roll between the lining and the spacer when the movable part moves with respect to the stationary part.

2. The invention of claim 1, wherein the lining comprises a nonmagnetic material.

3. The invention of claim 1, wherein:
   at least some of the bearings comprise a magnetic material that enables said bearings to move with respect to the stationary part in response to the excitation; and
   the spacer comprises a nonmagnetic material.

4. The invention of claim 1, wherein:
the spacer comprises a magnetic material and has a shape that enables the spacer to move with respect to the stationary part in response to the excitation; and
each bearing comprises a nonmagnetic material.

5. The invention of claim 1, wherein:
the movable part comprises a rotor adapted to rotate with respect to the stationary part; and
the stationary part does not have a fixed shaft for mounting the rotor such that the rotor would be able to rotate about said shaft.

6. The invention of claim 1, wherein each pole is defined by an electric coil having a magnetic core.

7. The invention of claim 6, wherein:
at least one magnetic core has a horseshoe shape; and
each of said horseshoe-shaped cores is shared ky at least two electric coils.

8. The invention of claim 6, wherein:
the stationary part comprises three phases, each phase having a plurality of serially connected electric coils, wherein each phase has a coil at each pole; and
the movable part is adapted to rotate with respect to the stationary part in response to three sine-wave currents, each applied to a respective one of said three phases, wherein each of said currents has a phase shift of about 120 degrees with respect to each of the other two sine-wave currents.

9. The invention of claim 1, wherein:
each bearing is a spherical ball.

10. The invention of claim 1, wherein:
the motor is implemented as a MEMS device; and
the stationary part is a substantially monolithic structure formed using a single substrate.

11. The invention of claim 1, wherein the motor has a lateral size smaller than about 5 mm.

12. The invention of claim 1, wherein:
the stationary part is formed using a single substrate, wherein said stationary part is a substantially monolithic structure; and
the movable part is inserted into a cavity defined by the stationary part.

13. A method of fabricating an electric motor, comprising:
forming a stationary part of the motor using a single substrate, wherein said stationary part is a substantially monolithic structure; and
inserting a movable part of the motor into a cavity defined by the stationary part, wherein:
the stationary part comprises a lining and a plurality of poles;
the movable part comprises a spacer and a plurality of bearings;
the stationary part defines a cavity, wherein the lining covers an interior wall of the cavity;
the lining is located between the poles and the movable part;
the spacer comprises a notched disk;
each bearing is located in a respective notch of said disk and at least partially confined between the spacer and the lining;
the spacer further comprises one or more springs, each adapted to push a respective bearing toward the lining;
the movable part is adapted to rotate with respect to the stationary part within the cavity in response to excitation of one or more of the poles; and
the bearings are adapted to roll between the lining and the spacer when the movable part moves with respect to the stationary part.

14. The invention of claim 13, wherein:
the motor is implemented as a MEMS device; and
the motor has a lateral size smaller than about 5 mm.

15. An electric motor, comprising:
a stationary part that comprises a lining and a plurality of poles; and
a movable part that comprises a spacer and a plurality of bearings, wherein:
the lining is located between the poles and the movable part;
each bearing is at least partially confined between the spacer and the lining;
the movable part is adapted to move with respect to the stationary part in response to excitation of one or more of the poles;
the bearings are adapted to roll between the lining and the spacer when the movable part moves with respect to the stationary part;
each pole is defined by an electric coil having a magnetic core;
the stationary part comprises three phases, each phase having a plurality of serially connected electric coils, wherein each phase has a coil at each pole; and
the movable part is adapted to rotate with respect to the stationary part in response to three sine-wave currents, each applied to a respective one of said three phases, wherein each of said currents has a phase shift of about 120 degrees with respect to each of the other two sine-wave currents.

* * * * *